United States Patent
Horn et al.

(10) Patent No.: US 11,109,305 B2
(45) Date of Patent: Aug. 31, 2021

(54) EXTENDED FEATURE INDICATION IN NR

(71) Applicant: QUALCOMM Incorporated, San Diego, CA (US)

(72) Inventors: Gavin Bernard Horn, La Jolla, CA (US); Ozcan Ozturk, San Diego, CA (US); Peerapol Tinnakornsrisuphap, San Diego, CA (US); Linhai He, San Diego, CA (US); Charles Alfred Bergan, Cardiff, CA (US); Ajay Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 16/746,033

(22) Filed: Jan. 17, 2020

(65) Prior Publication Data
US 2020/0245229 A1  Jul. 30, 2020

Related U.S. Application Data

(60) Provisional application No. 62/797,400, filed on Jan. 28, 2019.

(51) Int. Cl.
*H04W 48/10* (2009.01)
*H04W 72/04* (2009.01)

(52) U.S. Cl.
CPC ........... *H04W 48/10* (2013.01); *H04W 72/04* (2013.01)

(58) Field of Classification Search
None
See application file for complete search history.

(56) References Cited

U.S. PATENT DOCUMENTS

2020/0178343 A1* 6/2020 Kim .................. H04W 76/18
2020/0229076 A1* 7/2020 Jin .................... H04W 8/22

FOREIGN PATENT DOCUMENTS

| EP | 3611960 A1 | 2/2020 |
| WO | 2017200978 A1 | 11/2017 |
| WO | 2018202122 A1 | 11/2018 |

OTHER PUBLICATIONS

International Search Report and Written Opinion—PCT/US2020/014229—ISA/EPO—Apr. 22, 2020.

(Continued)

*Primary Examiner* — Hong S Cho
(74) *Attorney, Agent, or Firm* — Patterson & Sheridan, LLP

(57) ABSTRACT

Certain aspects of the present disclosure provide techniques for an extended feature indication in new radio (NR), such as for slice specific extension (SSE). Aspects provide a method that may be performed by a transmitter device, such as a user equipment (UE) or a network node (e.g., a base station (BS)). The method generally includes determining a network node supports an extended feature, the extended feature being associated with an extended feature identifier. The transmitter device transmits a message, the message including the extended feature identifier and an indication that the apparatus is using the extended feature. A receiver device can receive the message and process the message and/or one or more subsequent messages based on the indication that the transmitter device is using the extended feature and the extended feature identifier.

30 Claims, 14 Drawing Sheets

(56) References Cited

OTHER PUBLICATIONS

NTT DOCOMO, et al., "Slice Limitation Correction Based on Rel-15 EPC Extensions", 3GPP Draft, S2-187724 Slice Limitation R6-CLEAN, 3rd Generation Partnership Project (3GPP), Mobile Competence Centre, 650, Route Des Lucioles, F-06921 Sophia-Antipolis Cedex, France, vol. RAN WG2, No. Sophia, Antipolis, France, 20180820-20180824, Aug. 14, 2018 (Aug. 14, 2018), XP051536690, 5 pages, Retrieved from the Internet: URL: http://www.3gpp.org/ftp/tsg%5Fsa/WVG2%5FArch/TSGS2%5F128BIS%5FSophia%5FAntipolis/Docs/S2%2D187724%2Ezip.

* cited by examiner

EXTENDED FEATURE INDICATION IN NR

CROSS-REFERENCE TO RELATED APPLICATION(S)

This application claims benefit of and priority to U.S. Provisional Application No. 62/797,400, filed Jan. 28, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for an extended feature indication in new radio (NR), such as for slice specific extension (SSE).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a transmitter device. The method generally includes determining a network node supports an extended feature, the extended feature associated with an extended feature identifier. The method generally includes transmitting a message, the message including the extended feature identifier and an indication that the transmitter device is using the extended feature.

Certain aspects provide a method for wireless communication by a receiver device. The method generally includes receiving a message from a transmitter device, the message including an extended feature identifier and an indication that the transmitter device is using the extended feature. The method generally includes processing the message and/or one or more subsequent messages based on the indication that the transmitter device is using the extended feature and the extended feature identifier.

Certain aspects provide an apparatus for wireless communication, such as a transmitter device. The apparatus generally includes means for determining a network node supports an extended feature, the extended feature associated with an extended feature identifier. The apparatus generally includes means for transmitting a message, the message including the extended feature identifier and an indication that the apparatus is using the extended feature.

Certain aspects provide an apparatus for wireless communication, such as a receiver device. The apparatus generally includes means for receiving a message from a transmitter device, the message including an extended feature identifier and an indication that the transmitter device is using the extended feature. The apparatus generally includes means for processing at least one of: the message or one or more subsequent messages based on the indication that the transmitter device is using the extended feature and the extended feature identifier.

Certain aspects provide an apparatus for wireless communication, such as a transmitter device. The apparatus generally includes at least one processor coupled with a memory and configured to determine a network node supports an extended feature, the extended feature associated with an extended feature identifier. The apparatus generally includes a transmitter configured to transmit a message, the message including the extended feature identifier and an indication that the apparatus is using the extended feature.

Certain aspects provide an apparatus for wireless communication, such as a receiver device. The apparatus generally includes a receiver configured to receive a message from a transmitter device, the message including an extended feature identifier and an indication that the transmitter device is using the extended feature. The apparatus generally includes at least one processor coupled with a memory and configured to process message and/or one or more subsequent messages based on the indication that the transmitter device is using the extended feature and the extended feature identifier.

Certain aspects provide a computer readable medium having computer executable code stored thereon for wireless communication by a transmitter device. The computer readable medium generally includes code for determining a network node supports an extended feature, the extended feature associated with an extended feature identifier. The computer readable medium generally includes code for transmitting a message, the message including the extended feature identifier and an indication that the transmitter device is using the extended feature.

Certain aspects provide a computer readable medium having computer executable code stored thereon for wireless communication by a receiver device. The computer readable medium generally includes code for receiving a message from a transmitter device, the message including an extended feature identifier and an indication that the transmitter device is using the extended feature. The computer readable medium generally includes code for processing the message and/or one or more subsequent messages based on the indication that the transmitter device is using the extended feature and the extended feature identifier.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
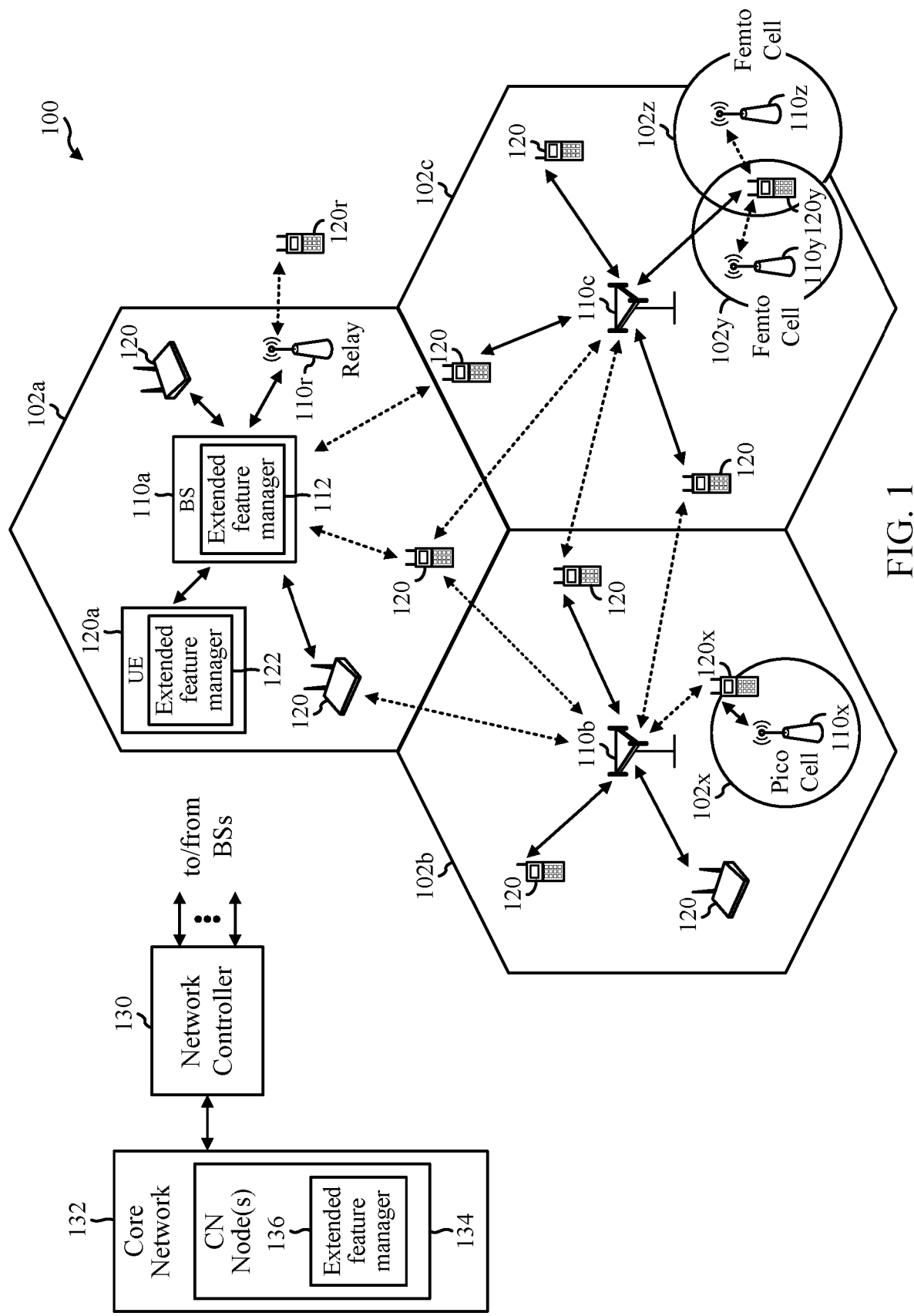
FIG. 1 is a block diagram conceptually illustrating an example telecommunications system, in accordance with certain aspects of the present disclosure.

Aspects of the present disclosure provide apparatus, methods, processing systems, and computer readable mediums for an extended feature indication in 5G NR.

In certain systems, extended features are desirable. An extended feature may include a feature not currently supported, such as a feature not adopted in current 3GPP technical standards, etc. An extended feature may be proprietary feature or optimization.

Aspects of the present disclose provide techniques and apparatus for indicating an extended feature, for example, in a 5G NR system (5GS). In aspects, the extended feature indication described herein may enable a forward compatible framework for introducing extended features. The extended feature(s) can be introduced independently at different network elements without impacting other network elements.

The following description provides examples of extended feature indication, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. The wireless communication network 100 may be an NR system (e.g., a 5G NR network). As shown in FIG. 1, the wireless communication network 100 may be in communication with a core network 132. The core network 132 may be in communication with one or more base station (BSs) 110a-z (each also individually referred to herein as BS 110 or collectively as BSs 110) and/or user equipment (UE) 120 in the wireless communication network 100 via one or more interfaces.

A BS 110 may provide communication coverage for a particular geographic area, sometimes referred to as a "cell" which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs. The network controller 130 may communicate with the BSs 110 via a backhaul. The BSs 110 communicate with UEs 120a-y (each also individually referred to herein as UE 120 or collectively as UEs 120) in the wireless communication network 100 that may be dispersed throughout the wireless communication network 100.

Wireless communication network 100 may also include relay stations (e.g., relay station 110r) that receive a transmission of data and/or other information from an upstream station (e.g., a BS 110a or a UE 120r) and sends a transmission of the data and/or other information to a downstream station (e.g., a UE 120 or a BS 110), or that relays transmissions for other UEs 120 in order to facilitate communication between devices.

The wireless communication network 100 may support extended feature indication. As shown in FIG. 1, a transmitter device, such as a UE 120a, BS 110a, or other CN node 136 in the wireless communication network 100 may be configured for extended feature indication. The UE 120a, BS 110a, and/or CN node 136 may include the extended feature manager 122a, 112a, and 138a, respectively, that may be configured to determine a device in the wireless communication network 100 supports an extended feature (such as a slice specific extension (SSE)). The extended feature is associated with an extended feature identifier (such a single network slice selection assistance information (S-NSSAI)). The extended feature manager 122a, 112a, and/or 138a transmit a message (e.g., a protocol data unit (PDU)) including the extended feature identifier and an indication that the transmitter device is using the extended feature (e.g., in a subheader of the PDU). A receiver device, such as a UE 120a, BS 110a, and/or other CN node 136 in the wireless communication network 100, can receive the message and process the message and/or one or more subsequent messages based on the indication that the transmitter device is using the extended feature and the extended feature identifier.

Figure 2:
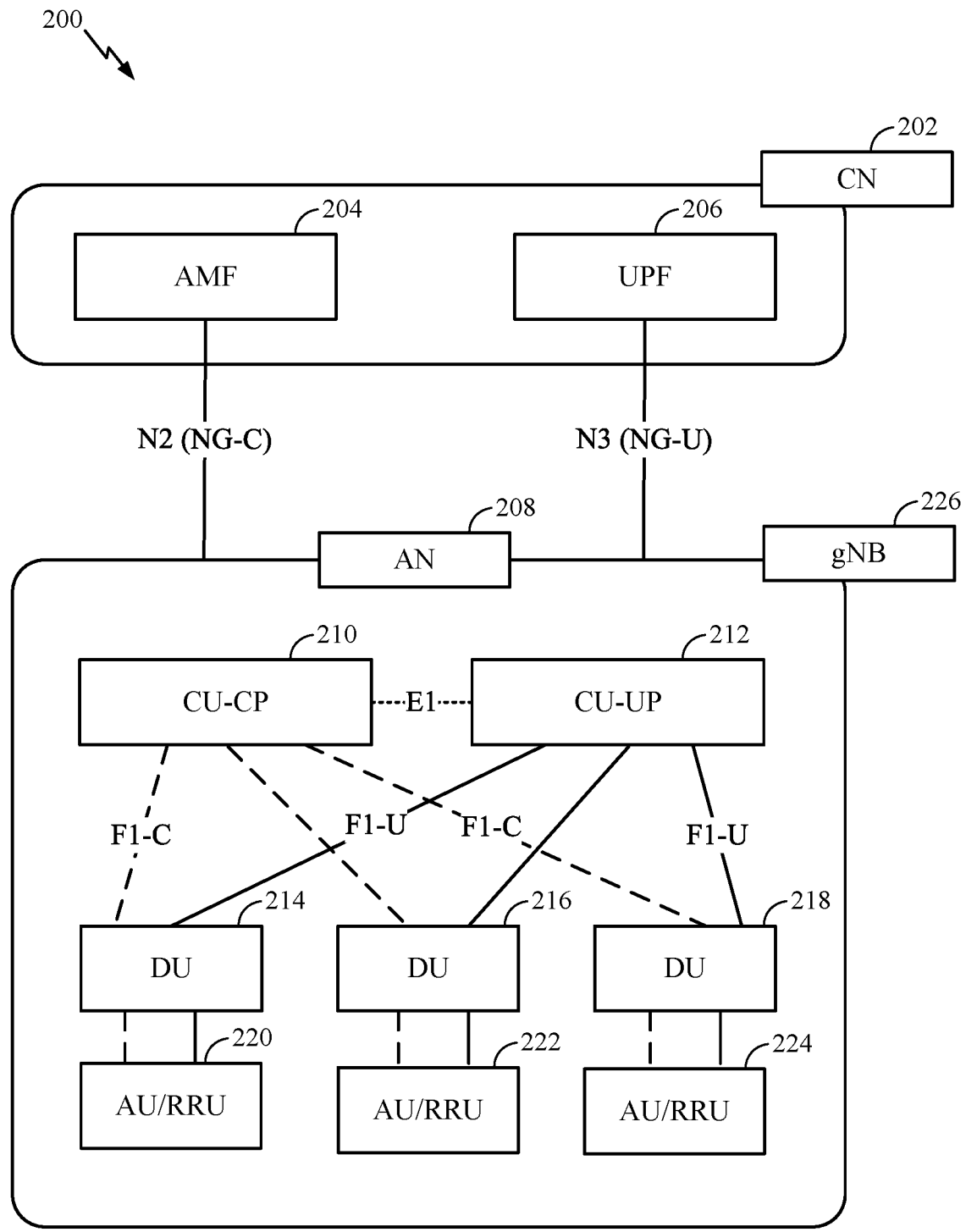
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the CU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via an Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
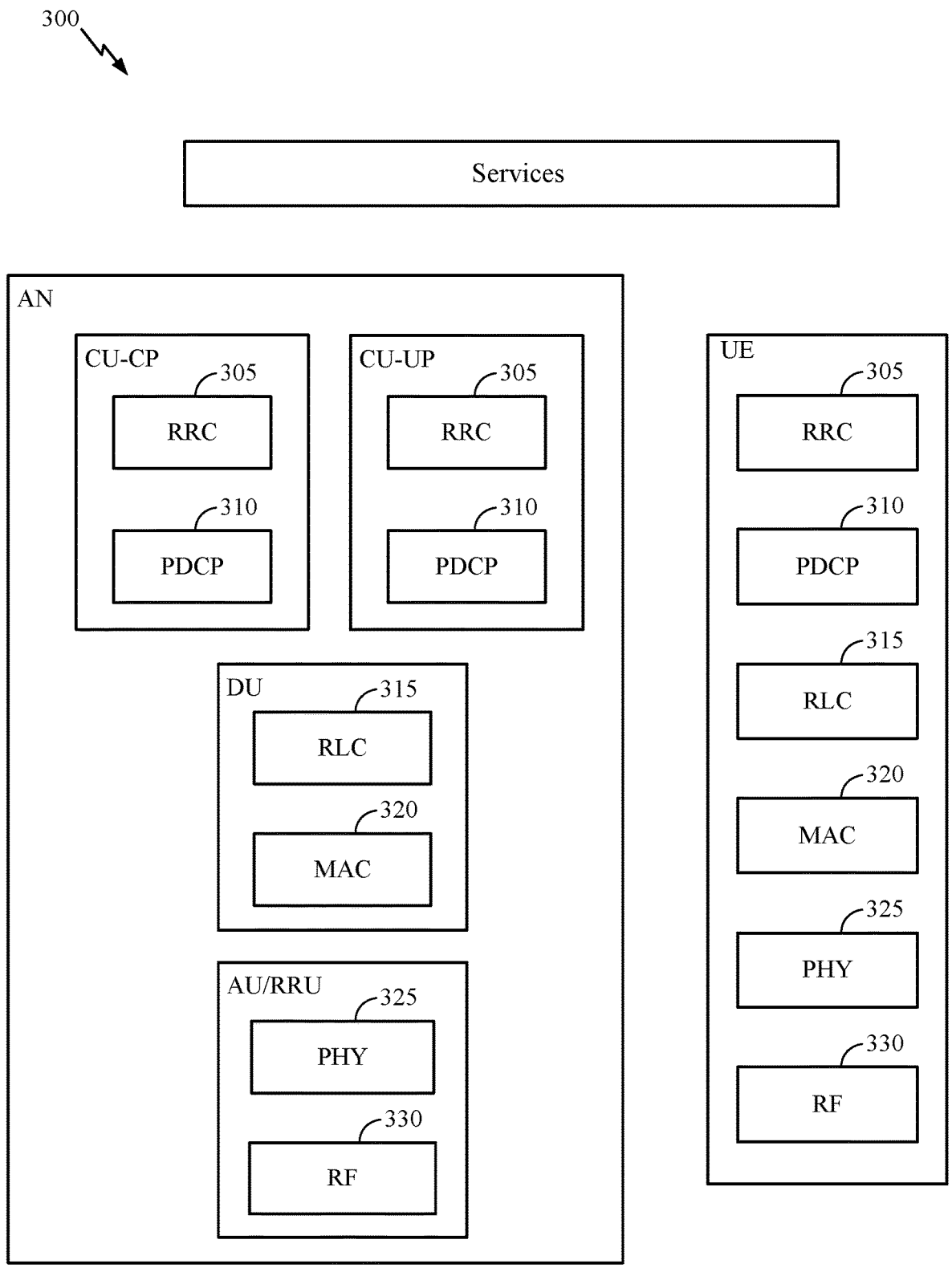
FIG. 3 is a diagram showing examples for implementing a communication protocol stack, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
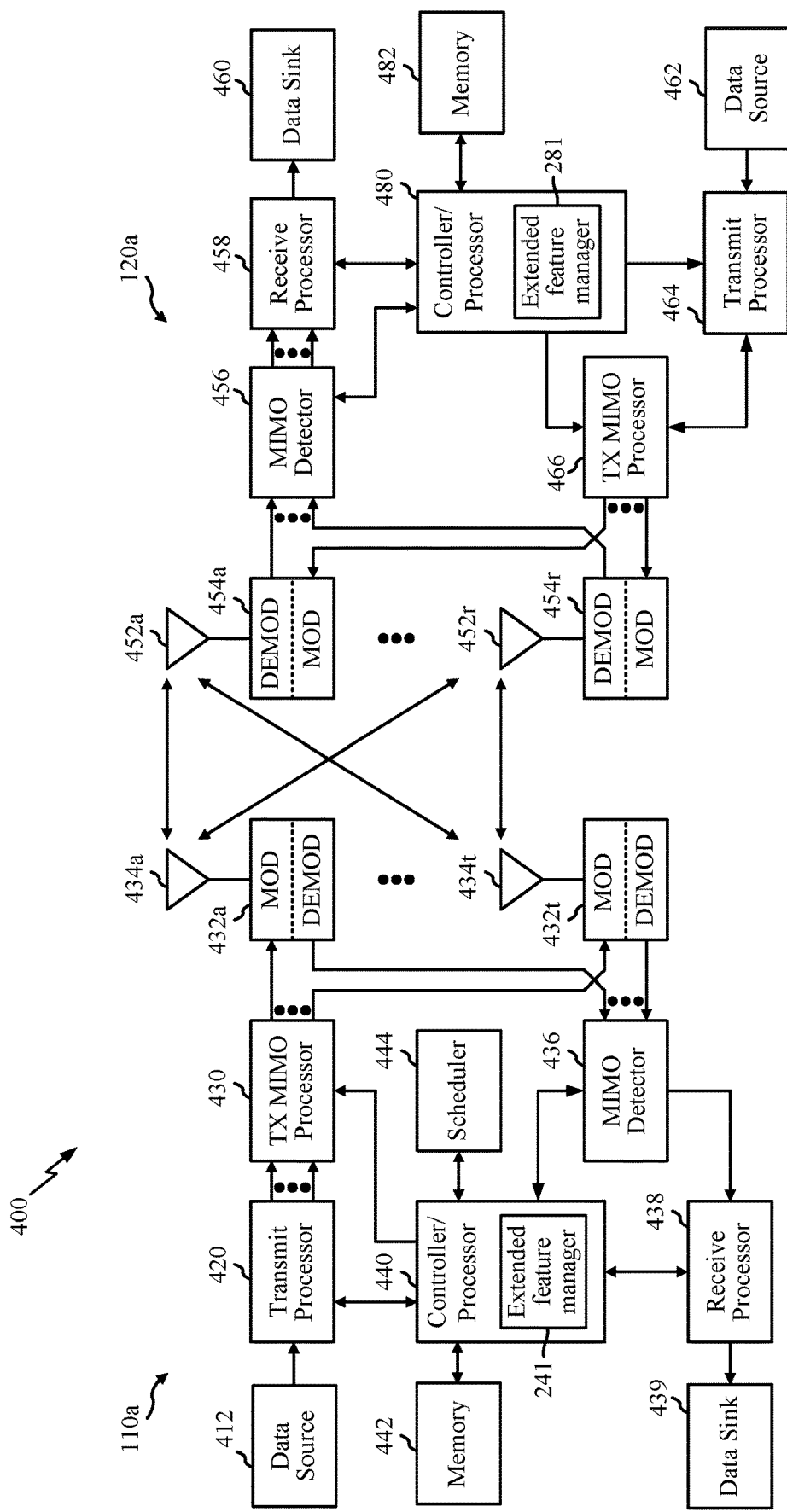
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and channel state information reference signal (CSI-RS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the BS 110a and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the modulators in transceivers 454a through 454r (e.g., for SC-FDM, etc.), and transmitted to the BS 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

Antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein for an extended feature indication in 5G NR. The controllers/processors 440 and 480 may direct the operation at the BS 110a and the UE 120a, respectively. As shown in FIG. 4, the controller/processors 440 and 480 include the extended feature manager 441 and 481, respectively, that may be configured for extended feature indication, in accordance with aspects of the present disclosure. The memories 442 and 482 may store data and program codes for BS 110a and UE 120a, respectively. A scheduler 444 may schedule UEs for data transmission on the downlink and/or uplink.

Figure 5:
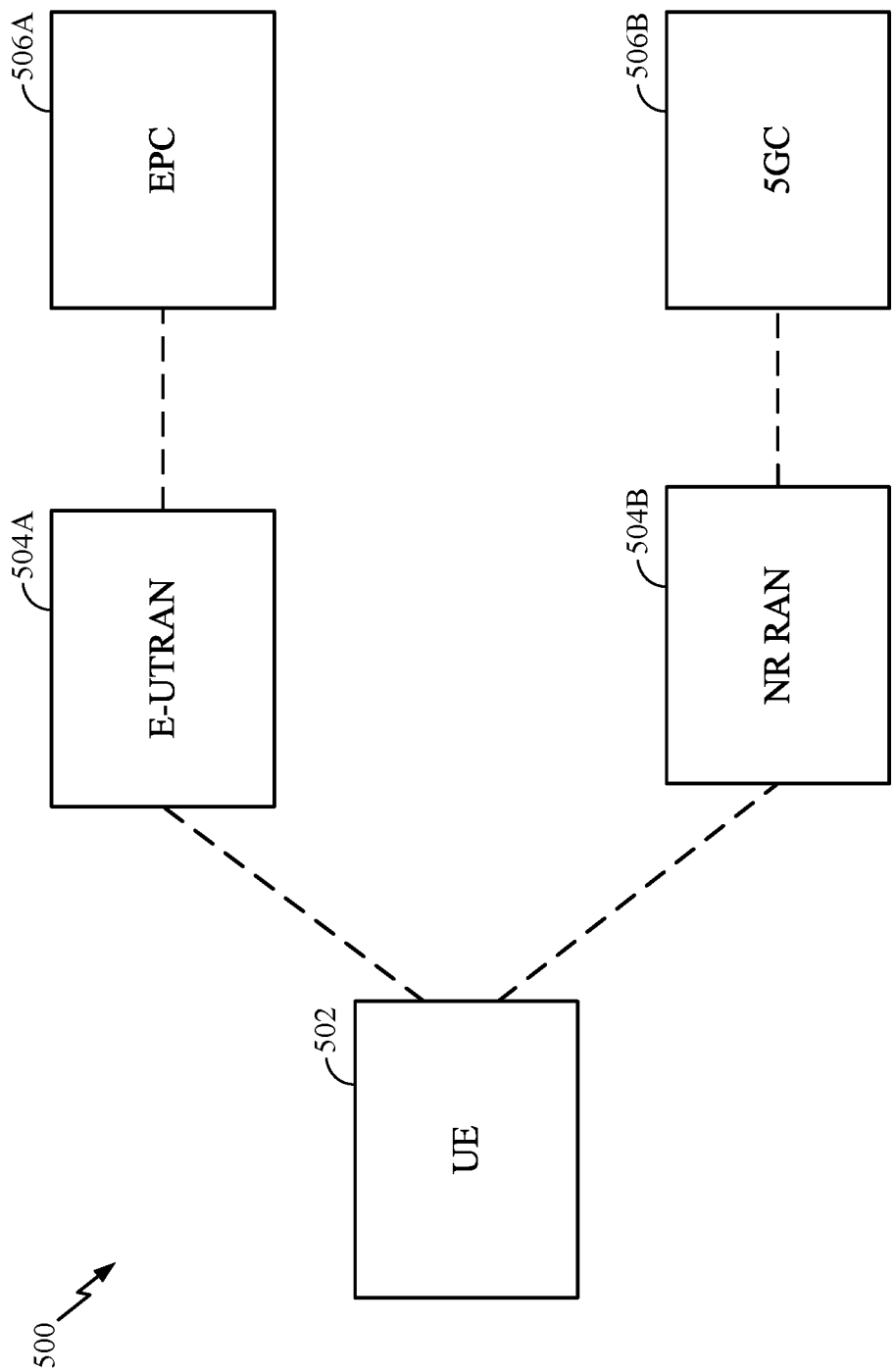
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

NR may utilize orthogonal frequency division multiplexing (OFDM) on the downlink and/or uplink and single-carrier frequency division multiplexing (SC-FDM) on the uplink and/or downlink. OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. For example, the spacing of the subcarriers may be 15 kHz and the minimum resource allocation (called a "resource block" (RB)) may be consecutive 12 subcarriers. The system bandwidth may also be partitioned into subbands. For example, a subband may cover multiple RBs.

Figure 6:
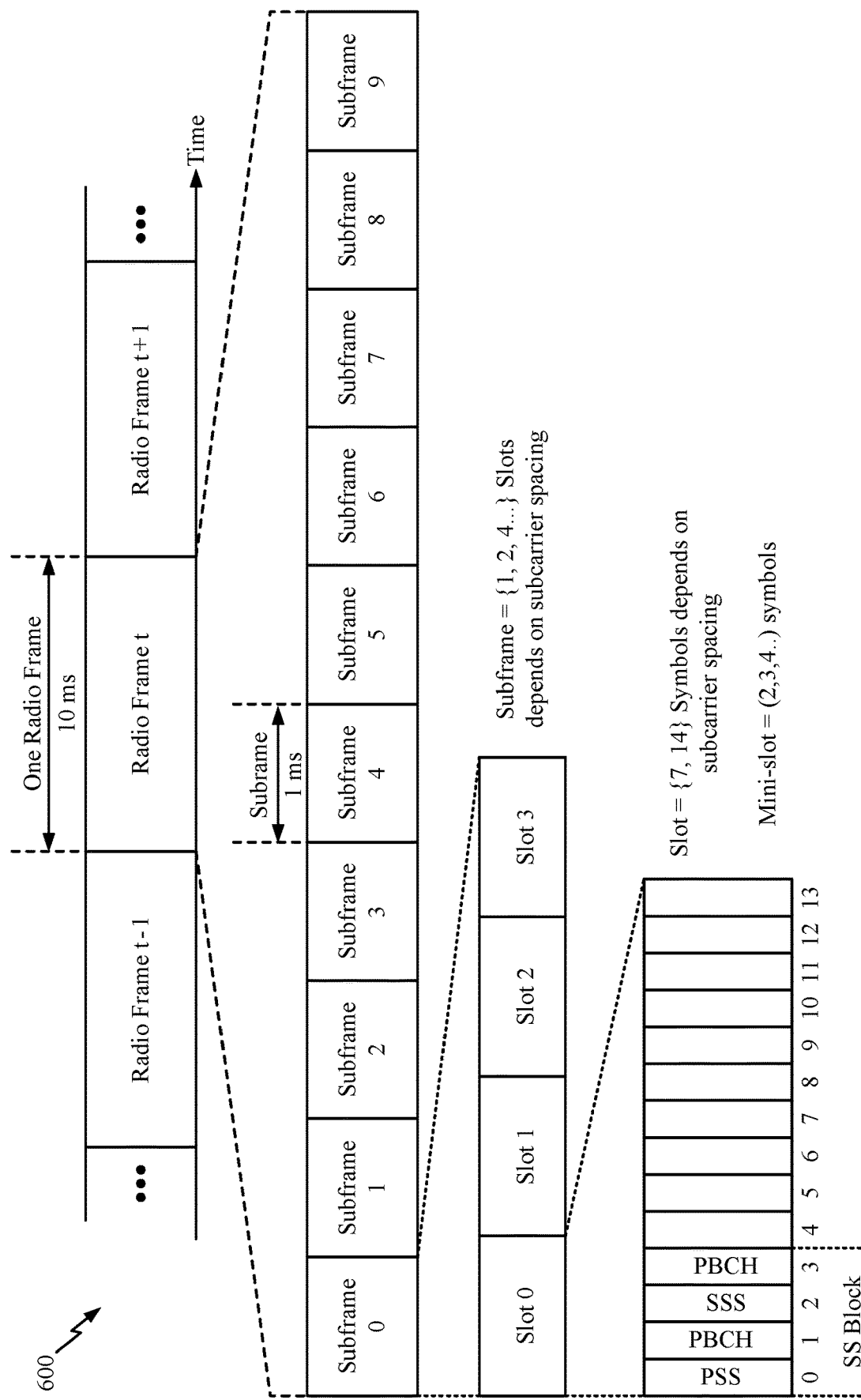
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing (SCS). The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
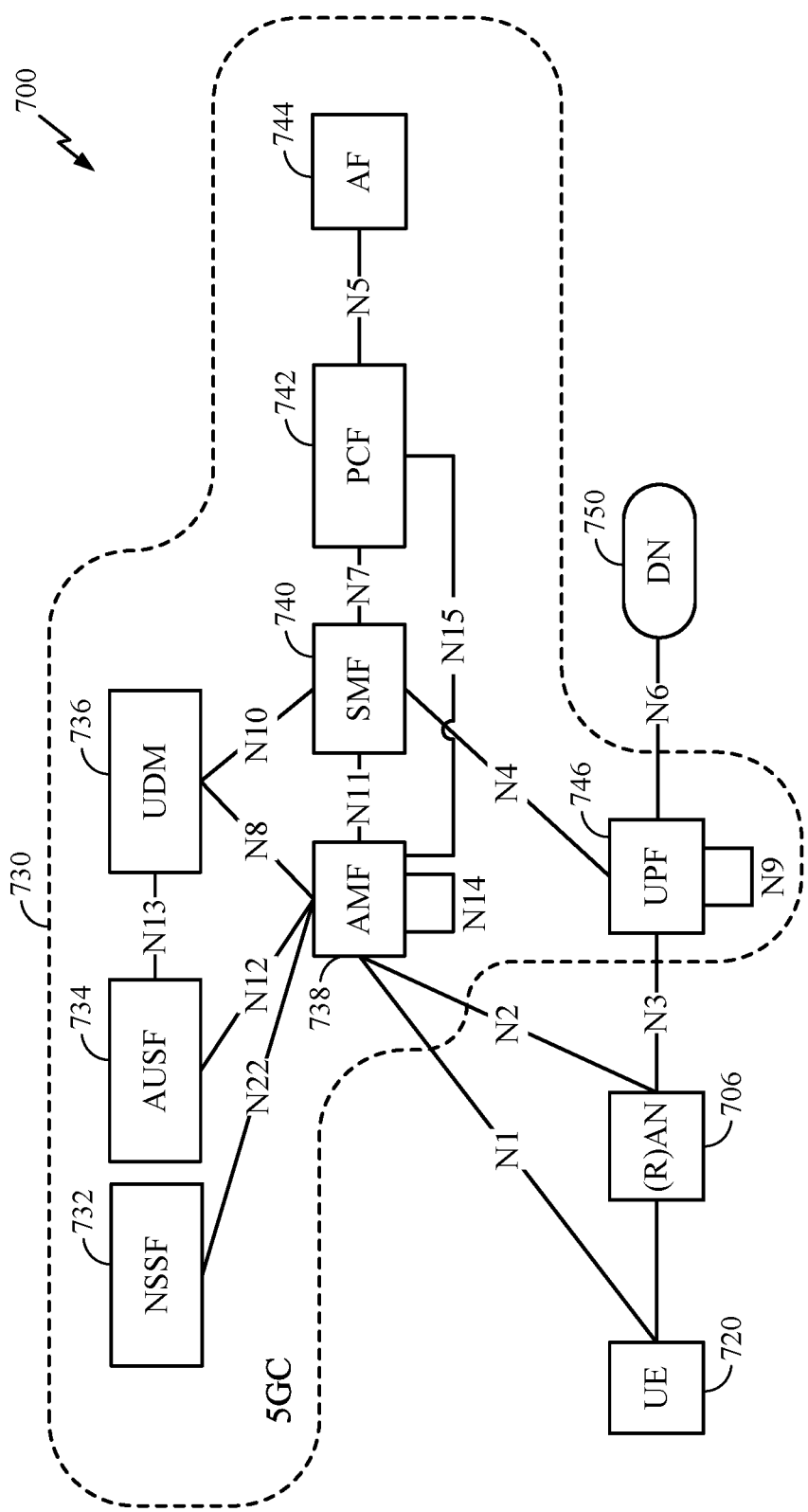
FIG. 7 is a diagram illustrating an example 5G NR system architecture, in accordance with certain aspects of the present disclosure.

FIG. 7 is a diagram illustrating an example 5GS architecture, according to aspects of the present disclosure. As shown, the 5GS architecture 700 includes an RAN 706, an UE 720, a core network (CN) 730, and a data network (DN) 750 (e.g. operator services, Internet access or third party services). The CN 730 may be implemented by one or more network entities that perform the following network functions (NF): Network Slice Selection Function (NSSF) 732; Authentication Server Function (AUSF) 734; Unified Data Management (UDM) 736; Access and Mobility Management Function (AMF) 738; Session Management Function (SMF) 740; Policy Control Function (PCF) 742; Application Function (AF) 744; User Plane Function (UPF) 746; and various other functions such as Unstructured Data Storage Function (UDSF); Network Exposure Function (NEF); NF Repository Function (NRF); Unified Data Repository (UDR); 5G-Equipment Identity Register (5G-EIR); Security Edge Protection Proxy (SEPP).

The AMF 738 includes the following functionality (some or all of the AMF functionalities may be supported in one or more instances of an AMF): Termination of RAN CP interface (N2); Termination of NAS (N1), NAS ciphering and integrity protection; Registration management; Connection management; Reachability management; Mobility Management; Lawful intercept (for AMF events and interface to LI System); Provide transport for SM messages between UE 720 and SMF 740; Transparent proxy for routing SM messages; Access Authentication; Access Authorization; Provide transport for SMS messages between UE 720 and SMSF; Security Anchor Functionality (SEAF); Security Context Management (SCM), which receives a key from the SEAF that it uses to derive access-network specific keys; Location Services management for regulatory services; Provide transport for Location Services messages between UE 720 and LMF as well as between RAN 706 and LMF; EPS Bearer ID allocation for interworking with EPS; and UE mobility event notification.

In certain aspects, the AMF 738 may interact with the AUSF 734 and the UE 720, receives the intermediate key that was established as a result of the UE authentication process. In the case of Universal Subscriber Identity Module (USIM) based authentication, the AMF 738 retrieves the security material from the AUSF 734.

Regardless of the number of Network functions, there may be only one NAS interface instance per access network between the UE 720 and the CN 730, terminated at one of the Network functions that implements at least NAS security and Mobility Management.

In addition to the functionalities of the AMF 738 described above, the AMF 738 may include the following functionality to support non-3GPP access networks: Support of N2 interface with N3IWF; Support of NAS signaling with a UE over N3IWF; Support of authentication of UEs connected over N3IWF; Management of mobility, authentication, and separate security context state(s) of a UE connected via non-3GPP access or connected via 3GPP and non-3GPP accesses simultaneously; Support a coordinated RM management context valid over 3GPP and Non 3GPP accesses; and Support dedicated CM management contexts for the UE for connectivity over non-3GPP access.

Not all of the functionalities are required to be supported in an instance of a Network Slice. In addition to the functionalities of the AMF 738 described above, the AMF 738 may include policy related functionalities as further described herein. Over the N2 interface, some information (e.g. 3GPP Cell Identification) and procedures (e.g. Handover related) defined over 3GPP access may not apply, and non-3GPP access specific information may be applied that do not apply to 3GPP accesses. Some procedures supported by NAS signaling over 3GPP access may be not applicable to untrusted non-3GPP (e.g. Paging) access.

The SMF 740 includes the following functionality (some or all of the SMF functionalities may be supported in one or more instances of an SMF): Session Management e.g. Session Establishment, modify and release, including tunnel maintain between UPF and AN node; UE IP address allocation & management (including optional Authorization); DHCPv4 (server and client) and DHCPv6 (server and client) functions; ARP proxying as specified in IETF RFC 1027 and/or IPv6 Neighbour Solicitation Proxying as specified in IETF RFC 4861 functionality for the Ethernet packet data units (PDUs) (The SMF responds to the ARP and/or the IPv6 Neighbour Solicitation Request by providing the MAC address corresponding to the IP address sent in the request.); Selection and control of UP function, including controlling the UPF to proxy ARP or IPv6 Neighbour Discovery, or to forward all ARP/IPv6 Neighbour Solicitation traffic to the SMF, for Ethernet PDU Sessions; Configures traffic steering at UPF to route traffic to proper destination; Termination of interfaces towards Policy control functions; Lawful intercept (for SM events and interface to LI System); Charging data collection and support of charging interfaces; Control and coordination of charging data collection at UPF; Termination of SM parts of NAS messages; Downlink Data Notification; Initiator of AN specific SM information, sent via AMF over N2 to AN; Determine SSC mode of a session; and Roaming functionality such as handle local enforcement to apply QoS SLAB (VPLMN), charging data collection and charging interface (VPLMN), lawful intercept (in VPLMN for SM events and interface to LI System), and support for interaction with external DN for transport of signaling for PDU Session authorization/authentication by external DN.

Not all of the functionalities are required to be supported in an instance of a Network Slice. In addition to the functionalities of the SMF 740 described above, the SMF 740 may include policy related functionalities as further described herein.

The UPF 746 includes the following functionality (some or all of the UPF functionalities may be supported in a single instance of a UPF): Anchor point for Intra-/Inter-RAT mobility (when applicable); External PDU Session point of interconnect to Data Network; Packet routing & forwarding (e.g. support of Uplink classifier to route traffic flows to an instance of a data network, support of Branching point to support multi-homed PDU Session); Packet inspection (e.g. Application detection based on service data flow template and the optional PFDs received from the SMF in addition); User Plane part of policy rule enforcement, e.g. Gating, Redirection, Traffic steering); Lawful intercept (UP collection); Traffic usage reporting; QoS handling for user plane, e.g. UL/DL rate enforcement or reflective QoS marking in DL; Uplink Traffic verification (SDF to QoS Flow mapping); Transport level packet marking in the uplink and downlink; Downlink packet buffering and downlink data notification triggering; Sending and forwarding of one or more "end marker" to the source NG-RAN node; and ARP proxying as specified in IETF RFC 1027 and/or IPv6 Neighbour Solicitation Proxying as specified in IETF RFC 4861 functionality for the Ethernet PDUs. The UPF responds to the ARP and/or the IPv6 Neighbour Solicitation Request by providing the MAC address corresponding to the IP address sent in the request. Not all of the UPF functionalities are required to be supported in an instance of user plane function of a Network Slice.

The UDM 736 includes support for the following functionality: Generation of 3GPP AKA Authentication Credentials; User Identification Handling (e.g. storage and management of SUPI for each subscriber in the 5G system); Access authorization based on subscription data (e.g. roaming restrictions); UE's Serving NF Registration Management (e.g. storing serving AMF for UE 720, storing serving SMF 740 for UE's PDU Session); Support to service/session continuity e.g. by keeping SMF/DNN assignment of ongoing sessions; MT-SMS delivery support; Lawful Intercept Functionality (especially in outbound roaming case where UDM 736 is the only point of contact for LI); Subscription management; SMS management;

To provide this functionality, the UDM 736 uses subscription data (including authentication data) that may be stored in UDR, in which case the UDM 736 implements the application logic and does not require an internal user data storage and then several different UDMs may serve the same user in different transactions.

The interaction between UDM 736 and HSS is implementation specific. The UDM 736 is located in the HPLMN of the subscribers it serves, and access the information of the UDR located in the same PLMN.

The UDR supports the following functionality: Storage and retrieval of subscription data by the UDM 736; Storage and retrieval of policy data by the PCF; Storage and retrieval of structured data for exposure, and application data (including Packet Flow Descriptions (PFDs) for application detection, application request information for multiple UEs), by the NEF. The UDR is located in the same PLMN as the NF service consumers storing in and retrieving data from it using Nudr, which is an intra-PLMN interface.

The NSSF 732 supports the following functionality: selecting of the network slice instances to serve the UE 720; determining the allowed NSSAI; and/or determining the AMF set to be used to serve the UE 720. A network slice may be defined as a logical network that provides specific network capabilities and network characteristics. A network slice instance may be defined as a set of network function instances and the required resources (e.g., compute, storage, and networking resources) which form a deployed network slice.

A network slice is identified by single network slice selection assistance information (S-NSSAI). NSSAI is a list of one or more S-NSSAIs. An S-NSSAI includes a slice/service type (SST), which refers to the expected network slice behavior (e.g., features and services), and a slice differentiator (SD), which is optional information that complements the SST(s) to differentiate amongst multiple network slices of the same SST. An S-NSSAI can have standard values (e.g., including an SST with a standardized SST value and no SD) or non-standard values (e.g., including an SST and an SD or including an SST without a standardized SST value and no SD). An S-NSSAI with a non-standard value identifies a single network slice within the PLMN with which it is associated. An S-NSSAI with a non-standard value may not be used by the UE in access stratum procedures in any PLMN other than the one to which the S-NSSAI is associated.

Network slices may differ with respects to supported features and network functions optimizations. For example, different S-NSSAIs may have different SSTs. An operator can deploy multiple network slice instances delivering the same features, but for different groups of UEs (e.g., dedicated to a customer different S-NSSAIs with the same SST but different SDs). The network may serve a single UE with one or more network slice instances simultaneously (e.g., via the 5G-AN). In some examples, a UE may be associated with up to eight different S-NSSAIs in total.

AMF instances can be common to network slice instances serving a UE. Selection of the set of network slice instances for a UE is triggered by the first contacted AMF in a registration procedure normally by interacting with the NSSF. A PDU session may belong to one specific network slice instance per PLMN. Different network slice instances may not share a PDU session, though different slices may have slice-specific PDU sessions using the same DNN.

In certain systems, extended features are desirable. An extended feature may include a new feature (e.g., a feature not currently supported), a feature not adopted in current 3GPP technical standards, etc. An extended feature may be proprietary feature or optimization. In some examples, it is desirable to implement an extended feature in the system. In some examples, but not limited to such examples, an extended feature may provide functionality not currently available in 3GPP. For example, an extended feature may provide a new header compression algorithm for an industrial IOT (Internet-of-Things) use case to compress the specific format of the control packets for the industrial sensor. Because this is a specific feature, it may be more efficient to define a propriety support for the algorithm (e.g., instead of going through an extended standards process to implement the feature in the 3GPP technical standards or other). Similar optimizations, such as special signaling for beam management or radio link monitoring (RLM) related to specific deployment models, or support for specific devices such as multi-SIM devices, may also be faster to deploy by supporting as an extended feature. Additionally, in some cases, a pre-standard version of a feature can be deployed earlier as an extended feature. For example, an early version of time sensitive networking (TSN) support for industrial IOT can be deployed while waiting for the 3GPP standard to enable a technical standard to support the feature.

Accordingly, techniques for supporting an extended feature are desirable.

Example Extended Feature Indication in NR

Aspects of the present disclose provide techniques and apparatus for indicating an extended feature, for example, in an NR system. The extended feature indication described herein may enable a forward compatible framework for introducing extended features, such as in a 5G system (5GS). For example, extended features may be introduced in the 5GS radio access network (RAN) and/or the core network (5GCN). The extended feature(s) can be introduced such that later systems (e.g., operating according to later releases of the technical standards) do not collide, overwrite, and/or cause ambiguity with the extended features.

In an illustrative example, if an extended feature were to be identified by using a reserved element in the packet data convergence protocol (PDCP) header, a subsequent release of the technical standard may use the same reserved element for another purpose/new feature. This would mean that either the new feature is not available to be used with the extended feature, or it may cause ambiguity if both are used simultaneously. In aspects, the extended feature(s) can be introduced independently at different network elements without impacting other network elements.

The techniques herein for extended feature indication may be used in various use cases and for various extended features. While example use cases are described, the techniques described herein are not limited to these examples. An example use case allows different verticals to introduce extended feature without going through 3GPP, while still able to take advantage of new 3GPP features in later releases. In some examples, an extended feature may include a slice specific extension (SSE). Certain aspects are described herein with respect to SSEs; however, the techniques are not limited to SSEs. For example, in some cases, an extended feature may be vendor-specific, operator specific, or deployment specific.

As mentioned above, according to certain aspects an extended feature (e.g., a SSE) can be introduced independently at each logical RAN node. This may allow a simpler deployment, for example, by localizing the impact of each introduced extended feature. Multi-node extended features may also be introduced, for example, at the radio resource control (RRC) layer.

Figure 8:
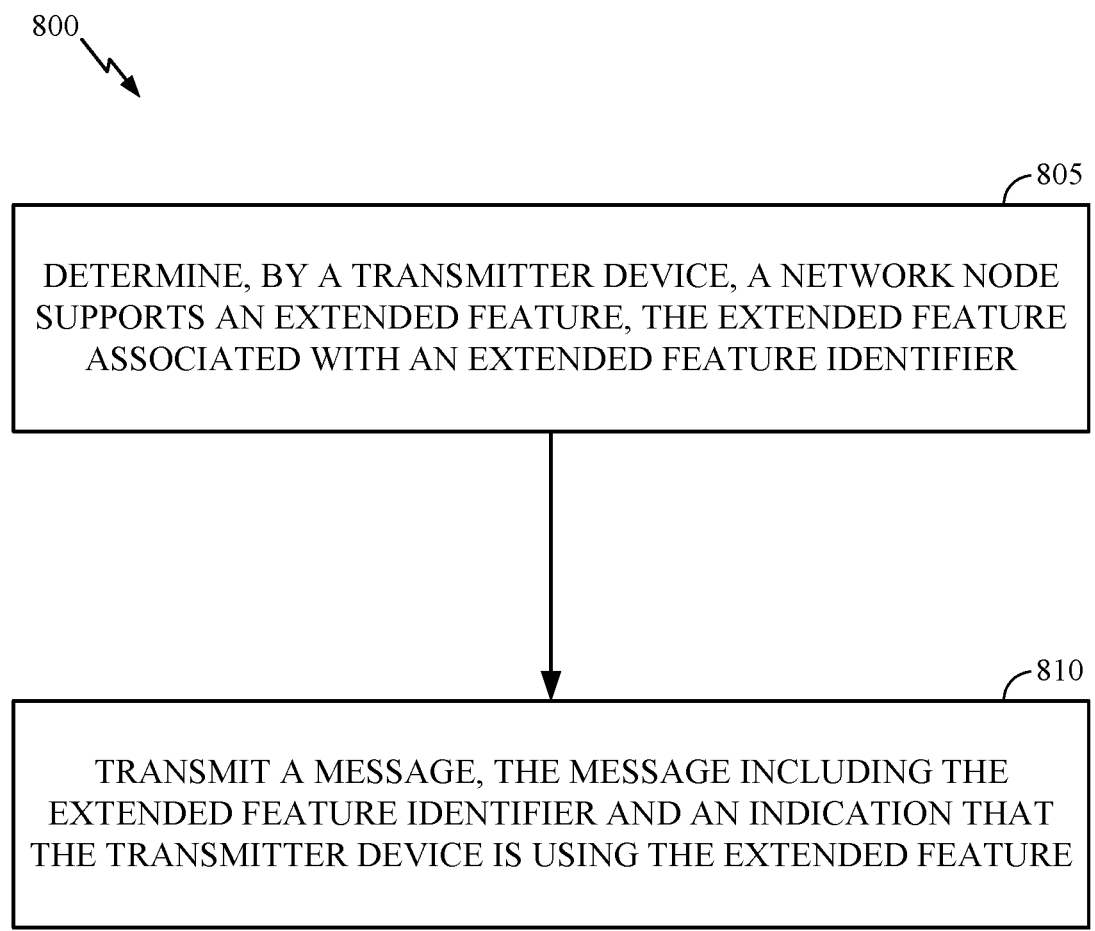
FIG. 8 is a flow diagram illustrating example operations for wireless communication by a transmitter device, in accordance with certain aspects of the present disclosure.

FIG. 8 is a flow diagram illustrating example operations 800 for wireless communication, in accordance with certain aspects of the present disclosure. The operations 800 may be performed, for example, by a transmitter device (e.g., such as a UE 120a, BS 110a, a CN node 136 in the wireless communication network 100, and/or one of the network entities shown in FIG. 2). Operations 800 may be implemented as software components that are executed and run on one or more processors (e.g., one of the processors described in FIG. 4). Further, the transmission and reception of signals by the transmitter device in operations 800 may be enabled, for example, by one or more antennas (e.g., one of the antennas described in FIG. 4). In certain aspects, the transmission and/or reception of signals by the transmitter device may be implemented via a bus interface of one or more processors (e.g., one of the processors described in FIG. 4) obtaining and/or outputting signals.

The operations 800 may begin, at 805, by determining a network node supports an extended feature (e.g., a SSE). According to certain aspects, the extended feature is associated with an extended feature identifier. In some examples, the extended feature identifier may be a single network slice selection assistance information (S-NSSAI). In some examples, the UE determines the network node supports the extended feature based on system broadcast information, non-access stratum (NAS) signaling, or radio resource control (RRC) signaling, that may be received from the network. In some examples, the system information broadcast, NAS, or RRC signaling includes the extended feature identifier.

At 810, the transmitter device transmits a message. The message includes the extended feature identifier (e.g., the S-NSSAI) and an indication (e.g., a flag) that the transmitter device is using the extended feature.

According to certain aspects, the extended feature indication (e.g., the indication that the feature is being used and/or the extended feature identifier) can be send using one or more reserved bits and/or information elements (IEs) in the protocol stack. According to certain aspects, the indication format is based on, or associated with, the protocol used and/or the network entity that the message is being sent to.

As shown in FIG. 3, a protocol layer stack may include RRC layer, data layer, and packet data convergence protocol (PDCP) layer that are associated with a control plane central unit (CU-CP) and/or a user plane central unit (CU-UP). In some examples, the CU-CP and/or the CU-UP may be a base station (BS), a transmit/receive point (TRP), a gNB, or the like. In some examples, the user equipment (UE), the CU-CP, and/or the CU-UP may send an extended feature indication. For example, the UE may send the CU-UP, and/or the CU-UP may send the UE, a PDCP data packet data unit (PDU) including the extended feature indication (e.g., use of and/or identifier). In some examples, the extended feature could indicate a new header compression algorithm feature (e.g., such as Ethernet+application header compression for certain cases).

Figure 9:
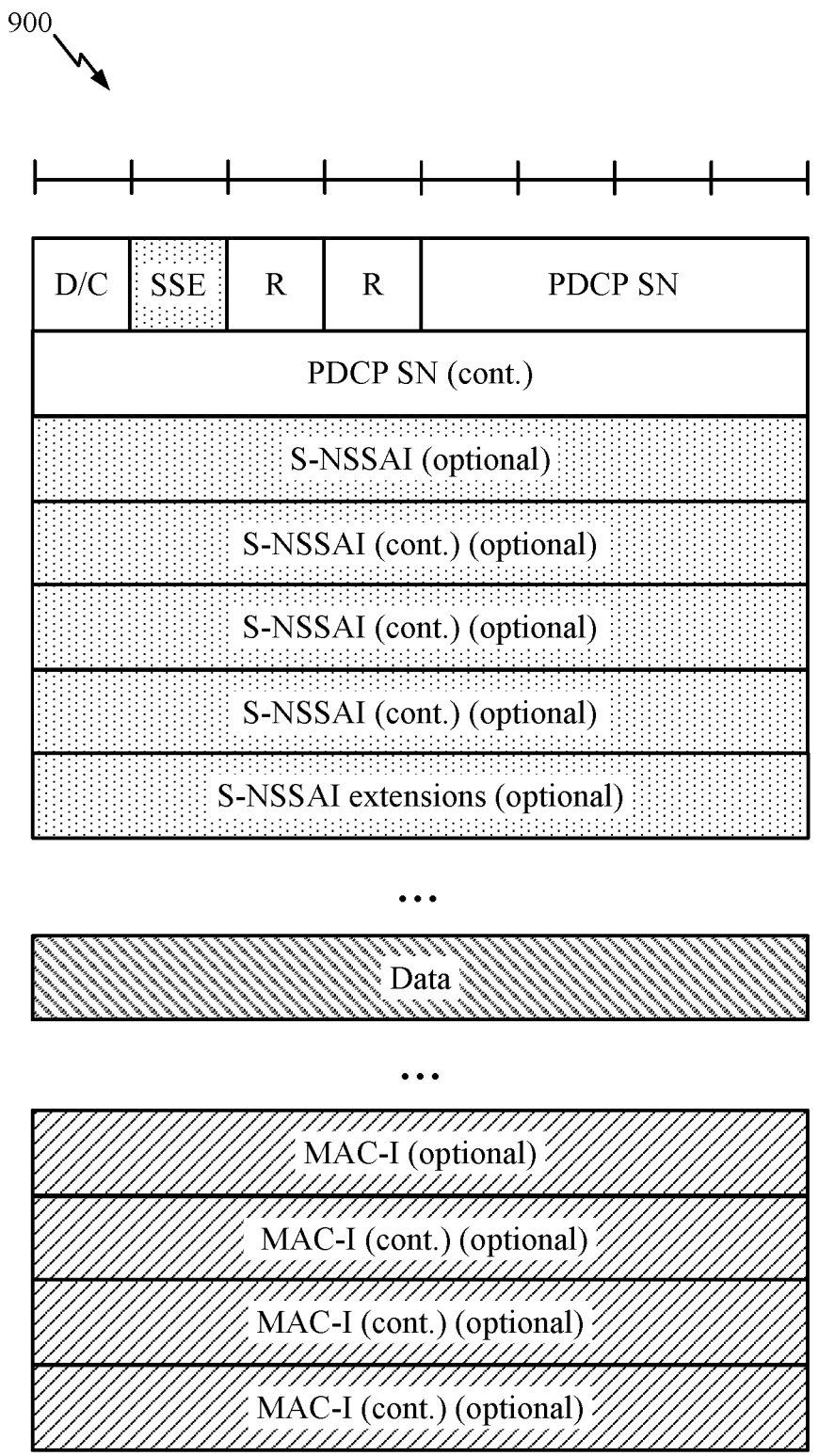
FIG. 9 illustrates an example packet data convergence protocol (PDCP) data protocol data unit (PDU) format for indicating an extended feature, in accordance with certain aspects of the present disclosure.

As shown in FIG. 9, the message may be a PDCP data PDU with a flag in the header indicating the extended feature (e.g., the SSE subfield). The PDPC data PDU further includes one or more S-NSSAIs and can also contain other information related to the extended feature. The PDCP data PDU may be transmitted to and/or from the UE and/or the CU-UP. The S-NSSAI extensions may include information related to the extended feature. For example, for the example header compression algorithm feature mentioned above, the S-NSSAI extensions may be the compressed header information or identification. In some examples, the message may be an RLC data PDU between the UE and the DU.

Figure 10:
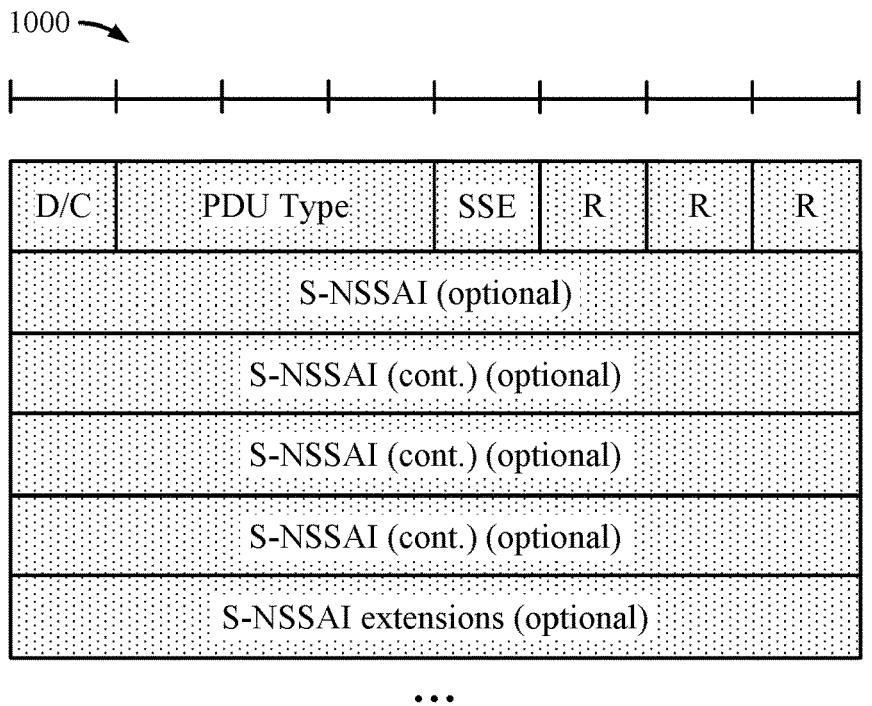
FIG. 10 illustrates an example PDCP control PDU format for indicating an extended feature, in accordance with certain aspects of the present disclosure.

As shown in FIG. 10, the message may be a PDCP control PDU with a flag in the header indicating the extended feature (e.g., the SSE subfield). The PDCP control PDU further includes one or more S-S-NSSAIs and can also contain other information related to the extended feature. The PDCP control PDU may be transmitted to/from the UE and/or CU-UP. The S-NSSAI extensions may include information related to the extended feature. For example, for the example header compression algorithm extended feature discussed above, the S-NSSAI extensions may include information related to managing (e.g., controlling) the header compression state between the UE and the CU-UP. In some examples, the message may be an RLC control PDU between the UE and the DU.

According to certain aspects, the message may be an RRC message. The RRC message may be between the UE and the CU-CP. The RRC message may indicate the extended feature via a flag in an abstract syntax notation (ASN) object identifier (e.g., the ASN.1) of the RRC message. In some examples, multi-SIM RRC signaling is supported using the ASN flag indicating the existence of the extended feature.

As shown in FIG. 3, the protocol layer stack may include radio link control (RLC) layer and the medium access control (MAC) layer that are associated with a distributed unit (DU). In some examples, the DU may be a BS, TRP, gNB, or the like. In some examples, the UE and/or the DU may send an extended feature indication. For example, the UE may send the DU, or the DU may send the UE, a MAC control element (MAC-CE) including the extended feature indication (e.g., indicating the use of the extended feature and/or indicating the extended feature identifier). In some examples, the extended feature may indicate a new beam management procedure feature, a new radio link management (RLM) feature, a group common physical downlink control channel (PDCCH) feature, an optimized semi-persistent scheduling (SPS) feature, or other extended feature.

Figure 11:
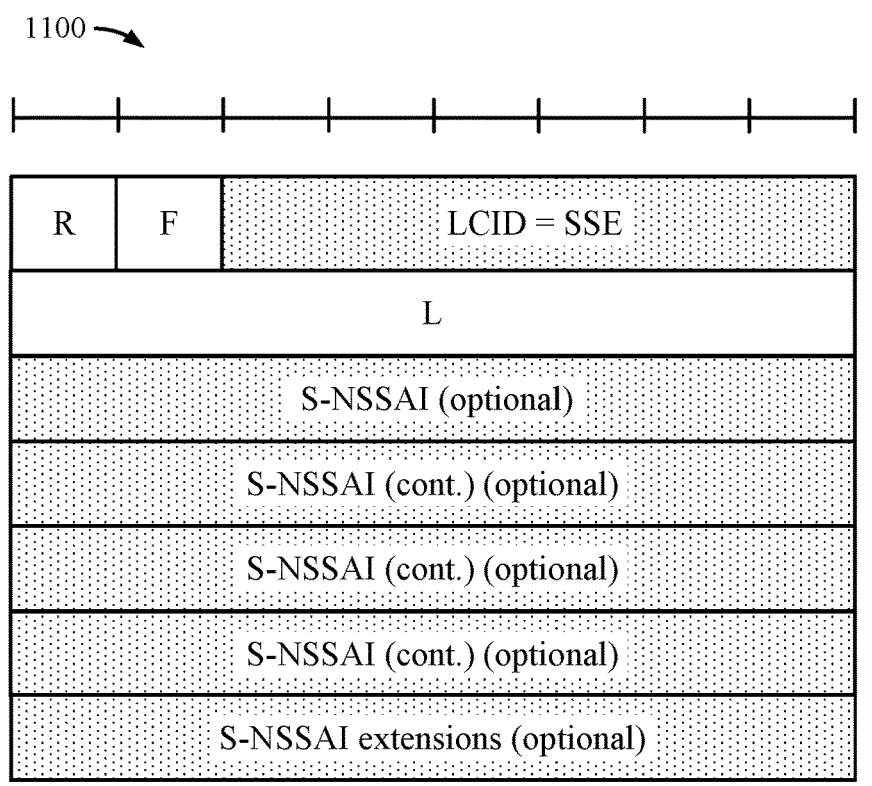
FIG. 11 illustrates an example medium access control (MAC) control element (CE) format for indicating an extended feature, in accordance with certain aspects of the present disclosure.

As shown in FIG. 11, the message may be a MAC-CE with an indication in the header indicating the extended feature. For example, the indication may be an SSE included in the R/F/LCID (logical channel ID)/L MAC subheader. The MAC-CE may further include one or more S-NSSAIs and can also contain other information related to the extended feature. The MAC-CE may be transmitted to and/or from the UE and/or the DU. The S-NSSAI extensions may include information related to the extended feature. For example, an example extended feature may define a more complex buffer status report incorporating delay and quality of service (QoS) details to enable a finer granularity of QoS between the UE and the DU, by providing the scheduler at the DU with more detailed information about the UL traffic in the queue at the UE.

According to certain aspects, the UE and the network (e.g., one or more network nodes) may perform a capability exchange of one or more capabilities related to support of the extended feature.

According to certain aspects, the UE may receive an authorization from the network node to use the extended feature.

According to certain aspects, the extended feature (e.g., SSE) may be activated from the CU-CP (e.g., based on authorization). The CU-CP may update the state of the UE at the CU-UP or DU. In some examples, authorization is based on slices supported by the UE, which may be indicated as part of a UE context received from the AMF during connection establishment. In some examples, authorization is negotiated based on capabilities of UE in RRC signaling with CU-CP. For example, the UE may signal support for the extended feature and the network activates the feature based on the signaling from the UE indicating the extended feature is supported. The capabilities may allow for new extended features to be included. For example, a special container in the capabilities related to identifying the extended features supported by the UE to the network may be exchanged as part of a Capabilities Query procedure. Extended feature information may be sent to the DU and/or the CU-UP as part of context setup of the UE. The extended feature information may include an identification of the extended feature such as an SSE ID (e.g., NSSAI). The extended feature information may include configuration information for an SSE feature such as a header compression profile within the SSE, a configuration of PDCP or RLC timers for the feature, or the like.

Figure 12:
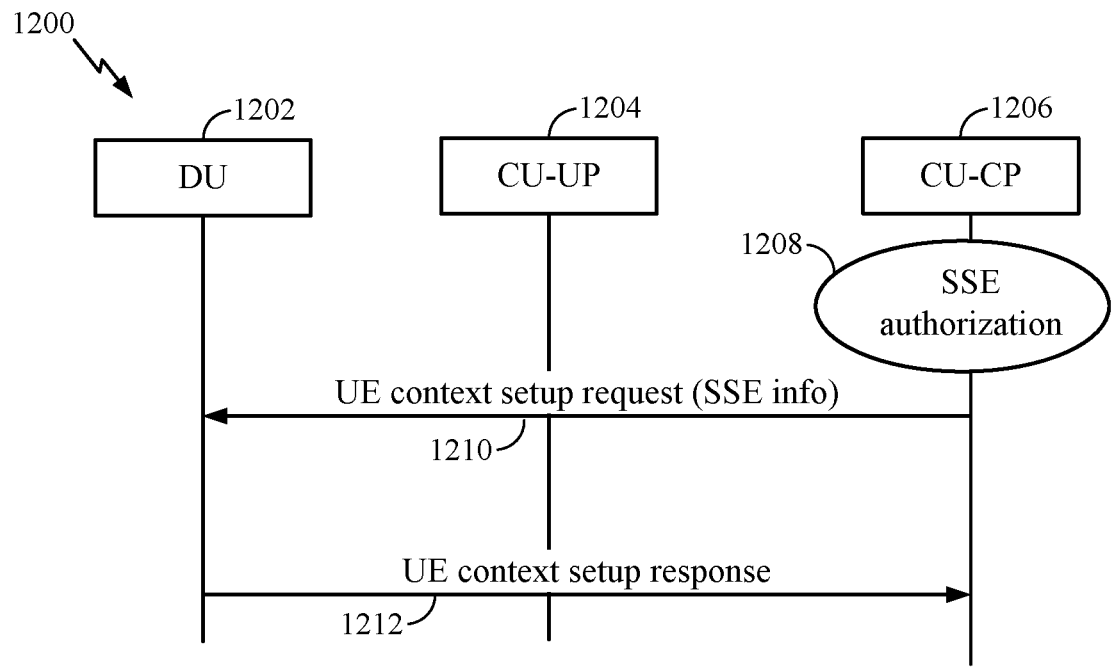
FIG. 12 is a call flow diagram illustrating example signaling for a slice specific extension (SSE) activation procedure for a distributed unit (DU) specific feature, in accordance with certain aspects of the present disclosure.

FIG. 12 is a call flow diagram 1200 illustrating signaling for a SSE activation procedure for a DU specific feature, in accordance with certain aspects of the present disclosure. As shown in FIG. 12, at 1208 the CU-CP 1206 authorizes a SSE. The CU-CP 1206 sends a UE context setup request message 1210, including SSE information, to the DU 1202. The DU 1202 sends a UE context setup response message 1212 to the CU-CP 1206.

Figure 13:
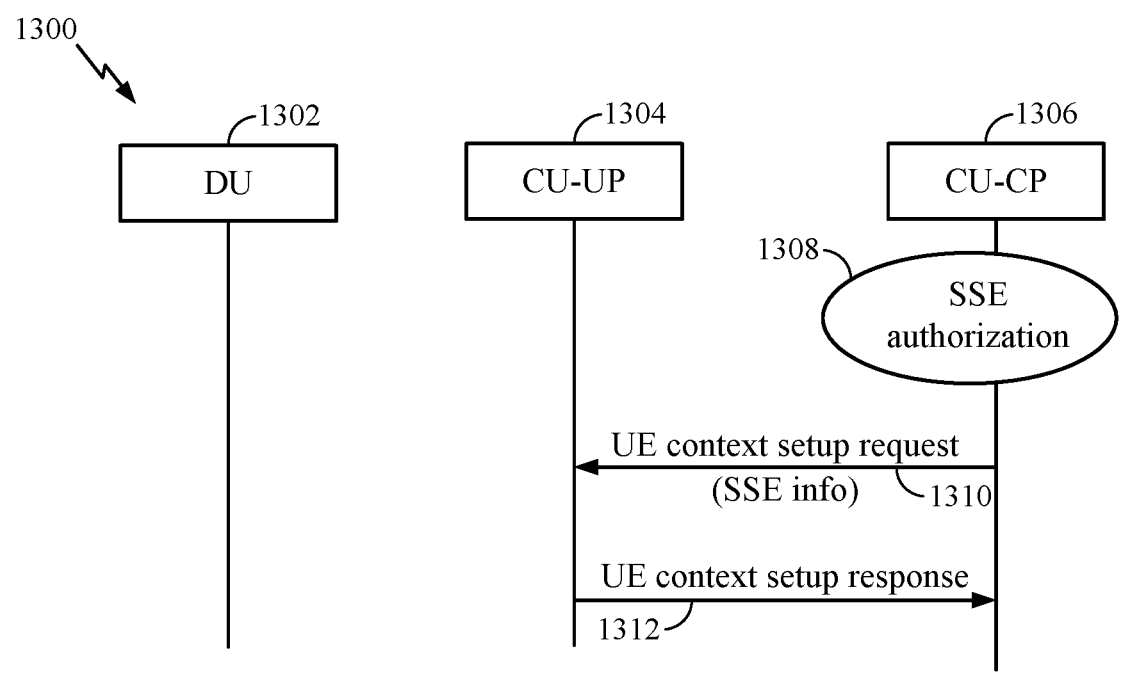
FIG. 13 is a call flow diagram illustrating example signaling for a SSE activation procedure for a central unit-user plane (CU-UP) specific feature, in accordance with certain aspects of the present disclosure.

FIG. 13 is a call flow diagram illustrating signaling for a SSE activation procedure for a CU-UP specific feature, in accordance with certain aspects of the present disclosure. As shown in FIG. 13, at 1308 the CU-CP 1306 authorizes a SSE. The CU-CP 1306 sends a UE context setup request message 1310, including SSE information, to the CU-UP 1304. The CU-UP 1304 sends a UE context setup response message 1312 to the CU-CP 1306.

Figure 14:
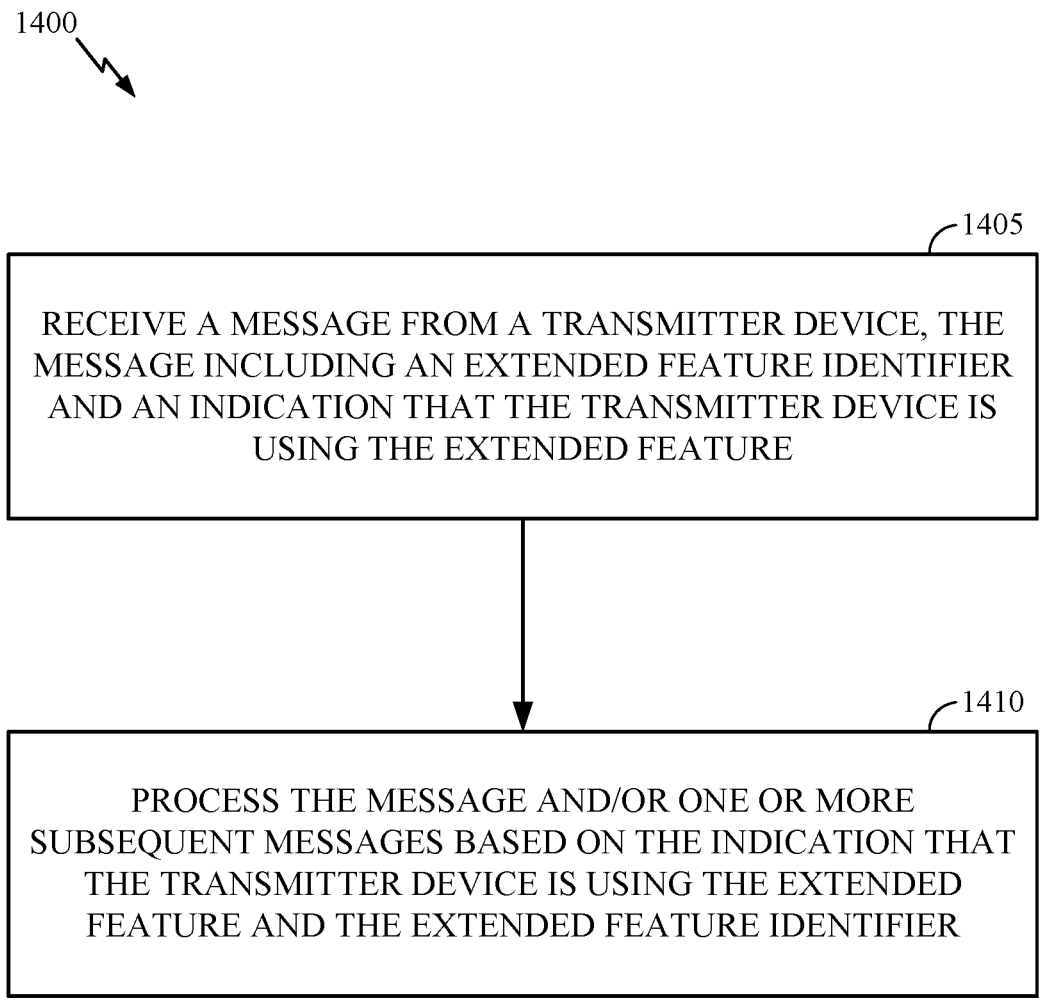
FIG. 14 is a flow diagram illustrating example operations for wireless communication by a receiver device, in accordance with certain aspects of the present disclosure.

FIG. 14 is a flow diagram illustrating example operations 1400 for wireless communication, in accordance with certain aspects of the present disclosure. The operations 1400 may be performed, for example, by a receiver device (e.g., such as a UE 120, a BS 110, or other node in the wireless communication network 100, for example shown in FIG. 2). The operations 1400 may be complimentary operations to the operations 1400 performed by the transmitter device. Operations 1400 may be implemented as software components that are executed and run on one or more processors (e.g., processors of FIG. 4). Further, the transmission and reception of signals by the receiver device in operations 1400 may be enabled, for example, by one or more antennas (e.g., antennas of FIG. 4). In certain aspects, the transmission and/or reception of signals by the receiver device may be implemented via a bus interface of one or more processors (e.g., processors of FIG. 4) obtaining and/or outputting signals.

The operations 1400 may begin, at 1405, by receiving a message from a transmitter device. The message may include an extended feature identifier (e.g., S-NSSAI) and an indication that the transmitter device is using the extended feature (e.g., an SSE). The message may include one or more IEs associated with the extended feature identifier. For example, the one or more IEs may include one or more S-NSSAI extensions.

In some examples, the message is a MAC-CE with a LCD in the MAC-CE. In some examples, the message is a PDCP control PDU with a flag in a header. In some examples, the message is a RLC control PDU with a flag in the header. In some examples, the message is a PDCP data PDU with a flag in the header. In some examples, the message is a RLC data PDU with a flag in the header. In some examples, the message is an RRC message with a flag in an ASN.1 object identifier.

At 1410, the receiver device processes the message and/or one or more subsequent messages based on the indication that the transmitter device is using the extended feature and the extended feature identifier.

According to certain aspects, the receiver device may send system information broadcast, NAS signaling, and/or RRC signaling indicating the receiver device supports the extended feature. The system information broadcast, NAS signaling, and/or RRC signaling may include the extended feature identifier.

According to certain aspects, the extended feature is activated, for example, by a CU-UP (e.g., as shown in FIG. 12 and/or FIG. 13). According to certain aspects, the receiver device sends an authorization to the transmitter device to use the extended feature. The receiver device may receive a UE context (e.g., via an AMF) during a connection establishment procedure with the UE. The receiver device may determine the transmitter device supports the extended feature and/or authorize the extended feature based on the received UE context. According to certain aspect, the receiver device performs a capability exchange of one or more capabilities related to (e.g., associated with) support of the extended feature. The receiver device may determine the transmitter device supports the extended feature based on the capability negotiation. The information may include a configuration of the extended feature. The receiver device may send information related to the extended feature to another node, such as the DU or the CU-UP (e.g., in the UE context setup request message). The information may include the extended feature identifier. The configuration of the extended feature may include header compression information, a PDCP timer, or a RLC timer associated with the extended feature. The receiver device may receive a UE context setup response message from the at least one network node.

According to certain aspects, the extended feature identifiers can be managed. For example, the S-NSSAI can be managed by centralized global management with specific globally unique identifiers. The global unique identifiers may be standardized, such as an industrial IOT (IIOT) use case. An industry standards body, such as Alliance for Connected Industries and Automation (ACIA) may request a set of S-NSSAIs and define related procedures for devices using those slices within the ACIA framework. In some examples, the S-NSSAI can be managed by operator specific management, for example, the operator assigns an S-NSSAI to the slice that defines the use of the feature in that operator network. In some examples, S-NSSAI management may be vendor specific, for example, a vendor receives the S-NSSAI instead of a specific vertical, and the vendor can then use the proprietary procedures without global coordination. In some example, the S-NSSAI may be unmanaged, for example, a random slice ID can be chosen assuming collision probability is low.

According to certain aspects, a SSE can coexist with an existing slice procedure including the possible reassignment of S-NSSAI when the UE slice is accepted by the network. For example, the UE may request a slice S-NSSAI 1 and receive a new slice ID S-NSSAI 2 in response. In this example, all the features related to S-NSSAI 1 are then labeled with the new S-NSSAI 2 for the UE. This can be used by an operator to switch the UE to a SSE slice, for example, if the UE request generic S-NSSAI 1 corresponding to a particular extended feature and operator assigns the UE S-NSSAI 2 corresponding to the same slice with the SSE activated.

As discussed above, in some examples, new SIB information can be used to advertise existence of the SSE features. In some examples, a network reassigns, or the UE requests, a specific S-NSSAI and the acceptance of the S-NSSAI indicates that the SSE features are available.

Figure 15:
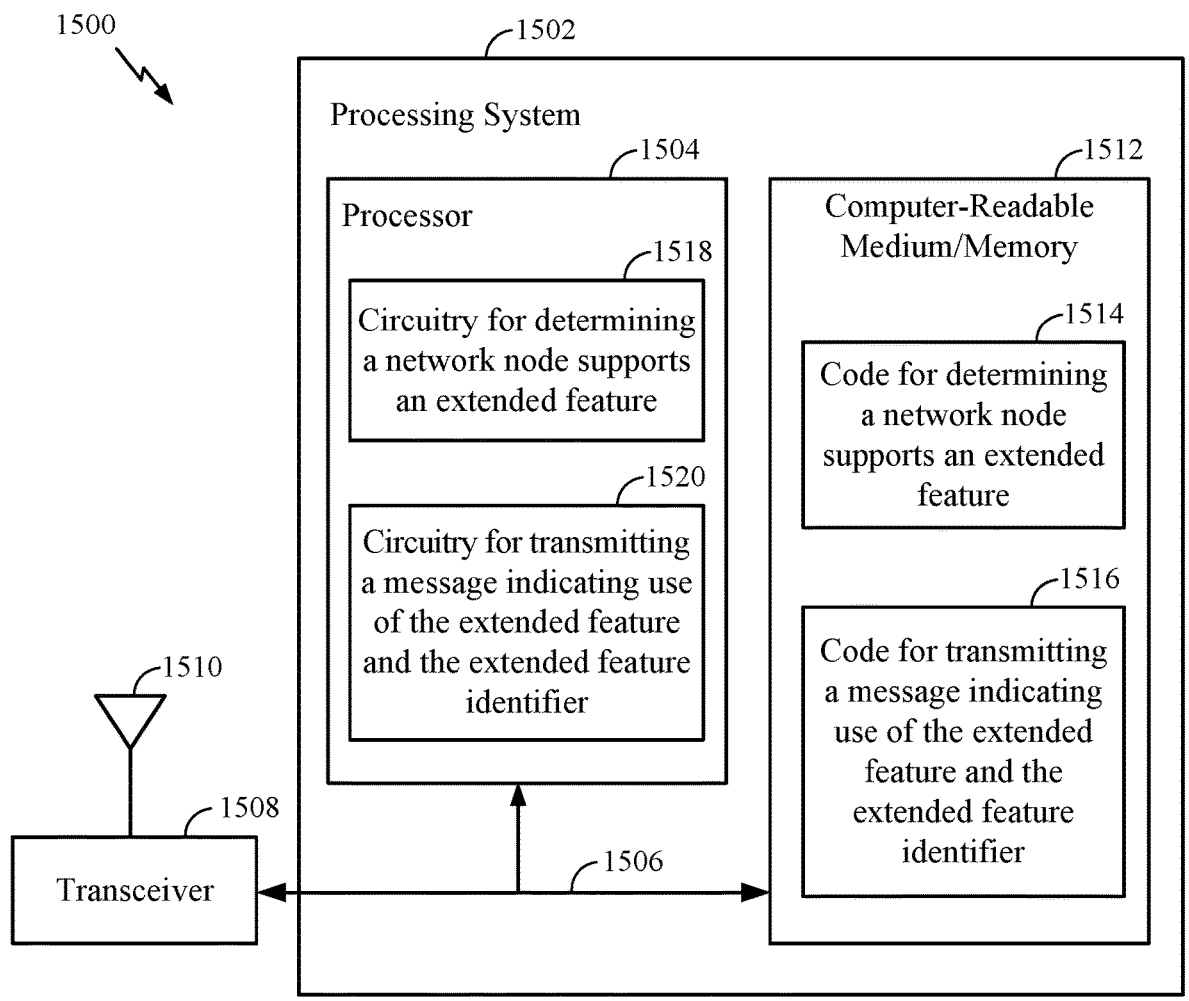
FIG. 15 illustrates a communications device that may include various components configured to perform operations for the techniques disclosed herein in accordance with aspects of the present disclosure.

According to certain aspects, a UE capability information RRC message can be extended to include specific SSE features. In some examples, in-band signaling may be used instead of RRC signaling. For example, a new MAC-CE may be used to activate the extended feature. If the network does respond, the UE may assume the extended feature is not supported FIG. 15 illustrates a communications device 1500 that may include various components (e.g., corresponding to means-plus-function components) configured to perform operations for the techniques disclosed herein, such as the operations illustrated in FIG. 8. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 8, or other operations for performing the various techniques discussed herein for an extended feature indication in 5G NR. In certain aspects, computer-readable medium/memory 1512 stores code 1514 for determining a network node supports an extended feature, the extended feature associated with an extended feature identifier and/or code 1516 for transmitting a message, the message including the extended feature identifier and an indication that the transmitter device is using the extended feature. In certain aspects, the processor 1504 has circuitry configured to implement the code stored in the computer-readable medium/memory 1512. The processor 1504 includes circuitry 1518 for determining a network node supports an extended feature, the extended feature associated with an extended feature identifier and/or circuitry 1520 for transmitting a message, the message including the extended feature identifier and an indication that the transmitter device is using the extended feature.

Figure 16:
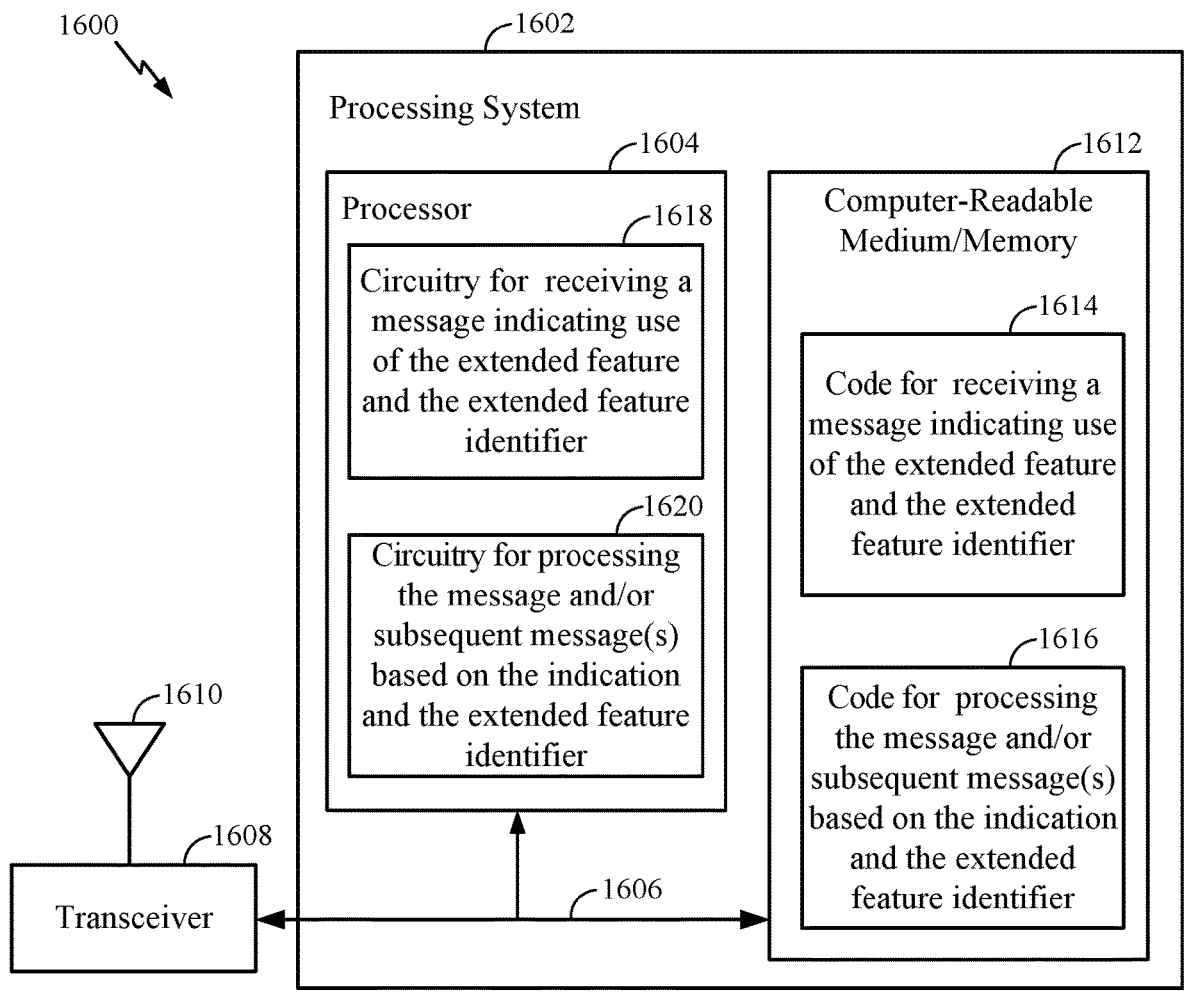
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 14. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 16, or other operations for performing the various techniques discussed herein for an extended feature indication in 5G NR. In certain aspects, computer-readable medium/memory 1612 stores code 1614 for receiving a message from a transmitter device, the message including an extended feature identifier and an indication that the transmitter device is using the extended feature and/or code 1616 for processing the message and/or one or more subsequent messages based on the indication that the transmitter device is using the extended feature and the extended feature identifier. In certain aspects, the processor 1604 has circuitry configured to implement the code stored in the computer-readable medium/memory 1612. The processor 1604 includes circuitry 1618 for receiving a message from a transmitter device, the message including an extended feature identifier and an indication that the transmitter device is using the extended feature and/or circuitry 1620 for processing the message and/or one or more subsequent messages based on the indication that the transmitter device is using the extended feature and the extended feature identifier.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In an LTE or LTE-A network, a set of one or more BSs may define an eNodeB (eNB). In other examples (e.g., in a 5G NR network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, gNB, TRP, etc.). A BS or DU may communicate with a set of UEs on downlink channels (e.g., for transmissions from a BS or DU to a UE) and uplink channels (e.g., for transmissions from a UE to BS or DU).

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8 and/or FIG. 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a transmitter device, comprising:
    determining a network node supports an extended feature, the extended feature associated with an extended feature identifier; and
    transmitting a message, the message including the extended feature identifier and an indication that the transmitter device is using the extended feature.

2. The method of claim 1, wherein the extended feature comprises a slice specific extension (SSE).

3. The method of claim 1, wherein the message further includes one or more information elements (IEs) associated with the extended feature identifier.

4. The method of claim 3, wherein the one or more IEs comprise one or more single network slice selection assistance information (S-NSSAI) extensions.

5. The method of claim 1, wherein the message is transmitted to the network node, another network node, a user equipment (UE), or a combination thereof.

6. The method of claim 1, further comprising receiving at least one of: system information broadcast, non-access stratum (NAS) signaling, or radio resource control (RRC) signaling, wherein the determination is based on the system information broadcast, NAS signaling, RRC signaling, or a combination thereof.

7. The method of claim 6, wherein at least one of the system information broadcast, NAS signaling, or RRC signaling includes the extended feature identifier.

8. The method of claim 1, wherein the extended feature identifier comprises single network slice selection assistance information (S-NSSAI).

9. The method of claim 1, wherein:
    the message comprises a medium access control (MAC) control element (CE); and
    the indication comprises a logical channel identifier (LCID) in the MAC-CE.

10. The method of claim 1, wherein:
    the message comprises a packet data convergence protocol (PDCP) control protocol data unit (PDU); and
    the indication comprises a flag in a header of the PDCP control PDU.

11. The method of claim 1, wherein:
    the message comprises a radio link control (RLC) protocol data unit (PDU); and
    the indication comprises a flag in a header of the RLC PDU.

12. The method of claim 1, wherein:
    the message comprises a packet data convergence protocol (PDCP) data protocol data unit (PDU); and
    the indication comprises a flag in a header of the PDCP data PDU.

13. The method of claim 1, wherein:
the message comprises a radio resource control (RRC) message; and
the indication comprises a flag in an abstract syntax notation (ASN) object identifier of the RRC message.

14. The method of claim 1, further comprising performing a capability exchange of one or more capabilities associated with the extended feature.

15. The method of claim 1, further comprising receiving an authorization from the network node to use the extended feature.

16. A method for wireless communication by a receiver device, comprising:
receiving a message from a transmitter device, the message including an extended feature identifier and an indication that the transmitter device is using the extended feature; and
processing at least one of: the message or one or more subsequent messages based on the indication that the transmitter device is using the extended feature and the extended feature identifier.

17. The method of claim 16, wherein:
the extended feature comprises a slice specific extension (SSE); and
the extended feature identifier comprises single network slice selection assistance information (S-NSSAI).

18. The method of claim 16, wherein the message further includes one or more information elements (IEs) comprising one or more single network slice selection assistance information (S-NS SAI) extensions.

19. The method of claim 16, further comprising sending at least one of: system information broadcast, non-access stratum (NAS) signaling, or radio resource control (RRC) signaling indicating the receiver device supports the extended feature.

20. The method of claim 16, further comprising:
receiving a user equipment (UE) context during a connection establishment procedure with the UE;
determining that the UE supports the extended feature based on the received UE context; and
sending an authorization to the UE to use the extended feature based on the determination that the UE supports the extended feature.

21. The method of claim 20, wherein the UE context is received via an access management function (AMF).

22. The method of claim 20, wherein the receiver device comprises a control plane centralized unit (CU-CP).

23. The method of claim 20, further comprising sensing information associated with the extended feature to at least one of: a distributed unit (DU) or a user plane centralized unit (CU-UP).

24. The method of claim 23, wherein the information associated with the extended feature is sent in a UE context setup request message.

25. The method of claim 24, further comprising receiving a UE context setup response message in response to the UE context setup request message.

26. The method of claim 23, wherein the information comprises the extended feature identifier.

27. The method of claim 26, wherein the information further comprises a configuration of the extended feature.

28. The method of claim 27, wherein the configuration of the extended feature comprises at least one of: header compression information, a packet data convergence protocol (PDCP) timer, or a radio link control (RLC) timer associated with the extended feature.

29. An apparatus for wireless communication, comprising:
a memory; and
at least one processor coupled with the memory and configured to:
determine a network node supports an extended feature, the extended feature associated with an extended feature identifier; and
transmit a message, the message including the extended feature identifier and an indication that the apparatus is using the extended feature.

30. An apparatus for wireless communication, comprising:
a memory; and
at least one processor coupled with the memory and configured to:
receive a message from a transmitter device, the message including an extended feature identifier and an indication that the transmitter device is using the extended feature; and
process at least one of: the message or one or more subsequent messages based on the indication that the transmitter device is using the extended feature and the extended feature identifier.

* * * * *